(12) United States Patent
Jiang et al.

(10) Patent No.: US 11,342,755 B2
(45) Date of Patent: May 24, 2022

(54) PHYSICAL ADDRESS DETERMINING METHOD, APPARATUS, AND DEVICE, AND STORAGE MEDIUM

(71) Applicant: Huawei Digital Power Technologies Co., Ltd., Shenzhen (CN)

(72) Inventors: Chengfeng Jiang, Shenzhen (CN); Chengyong Liu, Shenzhen (CN); Qingyuan Wang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/868,248

(22) Filed: May 6, 2020

(65) Prior Publication Data
US 2020/0266630 A1    Aug. 20, 2020

Related U.S. Application Data

(63) Continuation of application No. PCT/CN2018/102746, filed on Aug. 28, 2018.

(30) Foreign Application Priority Data

Nov. 7, 2017   (CN) .......................... 201711083505.9

(51) Int. Cl.
*H02J 3/38* (2006.01)
*H02S 50/10* (2014.01)
(Continued)

(52) U.S. Cl.
CPC ............ *H02J 3/381* (2013.01); *H02J 3/0012* (2020.01); *H02J 3/42* (2013.01); *H02S 50/10* (2014.12); *H02J 2300/26* (2020.01)

(58) Field of Classification Search
CPC .. H02J 3/381; H02J 3/0012; H02J 3/42; H02J 2300/26; H02S 50/10
(Continued)

(56) References Cited

U.S. PATENT DOCUMENTS 9,442,504 B2 * 9/2016 Porter ...................... G05F 1/67
2018/0233902 A1   8/2018 Sano et al.

FOREIGN PATENT DOCUMENTS

CN   101917137 A   12/2010
CN   104391779 A   3/2015
(Continued)

*Primary Examiner* — Hal Kaplan
(74) *Attorney, Agent, or Firm* — Womble Bond Dickinson (US) LLP

(57) ABSTRACT

A physical address determining method, apparatus, and device, and a storage medium, and belongs to the field of solar power generation, includes: controlling at least two slave nodes to sequentially start up, and detecting a change status of an input voltage of the master node; dividing a photovoltaic power generation system into a plurality of photovoltaic strings; and for each candidate photovoltaic string, controlling any slave node located in the candidate photovoltaic string to start up and other slave nodes to shut down, and using the physical address as a physical address of the candidate photovoltaic string. This disclosure provides a manner of automatically determining a physical address of a photovoltaic string, thereby implementing photovoltaic-string locating and expanding a system function range. When an anomaly occurs, the anomaly can be eliminated in a timely manner, thereby improving system stability.

14 Claims, 8 Drawing Sheets

(51) Int. Cl.
*H02J 3/00* (2006.01)
*H02J 3/42* (2006.01)

(58) Field of Classification Search
USPC .......................................................... 307/82
See application file for complete search history.

(56) References Cited

FOREIGN PATENT DOCUMENTS

| | | |
|---|---|---|
| CN | 104601086 A | 5/2015 |
| CN | 104917460 A | 9/2015 |
| CN | 105227126 A | 1/2016 |
| CN | 106130065 A | 11/2016 |
| CN | 107769250 A | 3/2018 |
| JP | 2017099228 A | 6/2017 |
| WO | 2017175535 A1 | 10/2017 |

* cited by examiner

PHYSICAL ADDRESS DETERMINING METHOD, APPARATUS, AND DEVICE, AND STORAGE MEDIUM

CROSS-REFERENCE TO RELATED APPLICATIONS

This application a continuation of International Application No. PCT/CN2018/102746, filed on Aug. 28, 2018, which claims priority to Chinese Patent Application No. 201711083505.9, filed on Nov. 7, 2017. The disclosures of the aforementioned applications are hereby incorporated by reference in their entireties.

TECHNICAL FIELD

This disclosure relates to the field of solar power generation, and in particular, to a physical address determining method, apparatus, and device, and a storage medium.

BACKGROUND

With improvement of people's living standards and advancement of science and technology, an energy shortage phenomenon in today's society is increasingly severe, posing a serious challenge to an energy issue. A fundamental way to resolve an energy problem is to develop environment-friendly renewable energy. Photovoltaic power generation that can convert renewable solar energy into electric energy, has many advantages such as resource abundance and extensiveness, and has become an important direction of energy development.

FIG. 1 is a schematic structural diagram of a photovoltaic power generation system. The photovoltaic power generation system includes at least one photovoltaic string 11 (FIG. 1 uses only two strings as an example) and an inverter 12. An output end of each photovoltaic string 11 is connected to an input end of the inverter 12. Each photovoltaic string 11 includes several series-connected groups of which each includes a photovoltaic module 111 and an optimizer 112 that are corresponding to each other.

To ensure normal operating of the system and to implement monitoring of the photovoltaic module by the inverter, a physical address of each optimizer in the photovoltaic string should be first determined, to precisely locate the optimizer. In a related technology, a voltage monitoring system is set up, and the voltage monitoring system includes a main monitoring apparatus and several voltage monitoring apparatuses. The main monitoring apparatus is connected to each voltage monitoring apparatus. Each voltage monitoring apparatus is corresponding to one optimizer in the photovoltaic string, and is configured to monitor a relative voltage between an output end of the optimizer and a voltage reference point. Because the photovoltaic string includes photovoltaic modules and optimizers that are connected in series, the relative voltage is different when the optimizer is at a different physical location in the photovoltaic string. Therefore, the main monitoring apparatus obtains a relative voltage of a corresponding optimizer from each voltage monitoring apparatus, and may determine an arrangement order of corresponding optimizers in the photovoltaic string based on relative voltages of the optimizers, thereby determining physical addresses of the corresponding optimizers.

In a process of implementing this disclosure, the inventor finds that the related technology has at least the following problems: According to the related technology, only the physical address of the optimizer in the photovoltaic string can be determined, and when a photovoltaic power generation system includes a plurality of photovoltaic strings, a physical address of each photovoltaic string cannot be determined. Therefore, a method for determining a physical address of a photovoltaic string is urgently required to implement photovoltaic-string locating.

SUMMARY

Embodiments of this disclosure provide a physical address determining method, apparatus, and device, and a storage medium, to resolve a problem existing in a related technology. The technical solutions are as follows.

According to one embodiment, a physical address determining method is provided, and is applied to a photovoltaic power generation system, where the photovoltaic power generation system includes a master node and a plurality of photovoltaic strings; an output end of each photovoltaic string is connected to an input end of the master node; each photovoltaic string includes at least one photovoltaic power generation group; each photovoltaic power generation group includes one photovoltaic module and one slave node; when any photovoltaic string includes at least two photovoltaic power generation groups, the at least two photovoltaic power generation groups are connected in series; and the method includes:

controlling at least two slave nodes in the photovoltaic power generation system to sequentially start up, and detecting a change status of an input voltage of the master node;

based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, where the superposition phenomenon is a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude;

when at least two slave node quantities in configuration data are equal, determining, from the plurality of photovoltaic strings obtained through grouping, a photovoltaic string whose slave node quantity is equal to the at least two slave node quantities, as a candidate photovoltaic string, where the configuration data includes a slave node quantity of each photovoltaic string and a physical address of each photovoltaic string; and for each determined candidate photovoltaic string, controlling any slave node located in the candidate photovoltaic string to start up and slave nodes other than the any slave node in the photovoltaic power generation system to shut down, determining a physical address of a photovoltaic string that has an input voltage or an input current, and using the physical address as a physical address of the candidate photovoltaic string.

In one embodiment, the controlling at least two slave nodes in the photovoltaic power generation system to sequentially start up, and detecting a change status of an input voltage of the master node includes:

controlling a first slave node in the photovoltaic power generation system to start up, detecting the input voltage, and using the input voltage as a first voltage;

when the first slave node has started up, controlling a second slave node in the photovoltaic power generation system to start up, detecting the input voltage, and using the input voltage as a second voltage; and comparing the first voltage with the second voltage.

In one embodiment, the based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings includes:

when no superposition phenomenon occurs on the second voltage compared with the first voltage, grouping the first slave node and the second slave node into different photovoltaic strings; or when the superposition phenomenon occurs on the second voltage compared with the first voltage, grouping the first slave node and the second slave node into a same photovoltaic string.

In one embodiment, after the based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, the method further includes:

when a first slave node quantity is different from other slave node quantities in the configuration data, determining, from the plurality of photovoltaic strings obtained through grouping, a physical address of a photovoltaic string whose slave node quantity is equal to the first slave node quantity, as a physical address corresponding to the first slave node quantity.

In one embodiment, a voltage monitoring apparatus or a current monitoring apparatus is disposed at an output end of each photovoltaic string, and the method further includes:

determining, by using the voltage monitoring apparatus or the current monitoring apparatus, whether the corresponding photovoltaic string has an input voltage or an input current.

In one embodiment, the method further includes:

setting up a locating table, where the locating table includes a physical address of each photovoltaic string and a logical address of each slave node in the corresponding photovoltaic string.

In one embodiment, each slave node in the photovoltaic power generation system is corresponding to one voltage monitoring apparatus, and the voltage monitoring apparatus is configured to monitor a relative voltage between an output end of the corresponding slave node and a voltage reference point, where the voltage reference point is the ground, a positive end of a photovoltaic string, or a negative end of a photovoltaic string. The method further includes:

for each photovoltaic string, when a slave node quantity of the photovoltaic string is greater than a preset quantity, dividing the photovoltaic string into a plurality of substrings, where each substring includes at least one photovoltaic power generation group, and a slave node quantity of each substring is not greater than the preset quantity;

for each substring in the photovoltaic string, determining, based on a monitored relative voltage of each slave node in the substring, an arrangement order of slave nodes located in the substring;

for any two substrings in the photovoltaic string, controlling any slave node in one substring and slave nodes in the other substring to start up, and determining an ordinal position of the any slave node in the other substring based on monitored relative voltages of the slave nodes that have started up, to determine an arrangement order of slave nodes in the any two substrings and determine an arrangement order of slave nodes in the photovoltaic string; and determining a physical address of each slave node in the photovoltaic string based on the arrangement order of the slave nodes in the photovoltaic string.

In one embodiment, after the determining a physical address of each slave node in the photovoltaic string based on the determined arrangement order, the method further includes:

when determining the physical address of each slave node, setting up a locating table, where the locating table may include a logical address of each slave node and the physical address of each slave node.

In one embodiment, before the controlling at least two slave nodes in the photovoltaic power generation system to sequentially start up, and detecting a change status of an input voltage of the master node, the method further includes:

for each connected slave node, controlling the slave node to start up and other slave nodes to shut down, and when determining that the input voltage of the master node is not detected, disconnecting from the slave node that has started up; or when determining that the input voltage of the master node is detected, determining that the slave node that has started up is located in the photovoltaic power generation system.

According to one embodiment, a physical address determining apparatus is provided, and is applied to a photovoltaic power generation system, where the photovoltaic power generation system includes a master node and a plurality of photovoltaic strings; an output end of each photovoltaic string is connected to an input end of the master node; each photovoltaic string includes at least one photovoltaic power generation group; each photovoltaic power generation group includes one photovoltaic module and one slave node; when any photovoltaic string includes at least two photovoltaic power generation groups, the at least two photovoltaic power generation groups are connected in series; and the apparatus includes:

a control module, configured to control at least two slave nodes in the photovoltaic power generation system to sequentially start up;

a detection module, configured to detect a change status of an input voltage of the master node when the at least two slave nodes are controlled to sequentially start up;

a string determining module, configured to: based on the detected change status, group any two slave nodes for which a superposition phenomenon occurs on the input voltage during sequential startup and corresponding photovoltaic modules into a same photovoltaic string, and group any two slave nodes for which no superposition phenomenon occurs on the input voltage during sequential startup and corresponding photovoltaic modules into different photovoltaic strings, to obtain a plurality of photovoltaic strings, where the superposition phenomenon is a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude; and an address determining module, configured to: when at least two slave node quantities in configuration data are equal, determine, from the plurality of photovoltaic strings obtained through grouping, a photovoltaic string whose slave node quantity is equal to the at least two slave node quantities, as a candidate photovoltaic string, where the configuration data includes a slave node quantity of each photovoltaic string and a physical address of each photovoltaic string; and for each determined candidate photovoltaic string, control any slave node located in the candidate photovoltaic string to start up and slave nodes other than the any slave node in the photovoltaic power generation system to shut down, determine a physical address of a photovoltaic string that has an input voltage or an input current, and use the physical address as a physical address of the candidate photovoltaic string.

In one embodiment, the control module is configured to control a first slave node in the photovoltaic power generation system to start up;

the detection module is configured to: when the first slave node is controlled to start up, detect the input voltage, and use the input voltage as a first voltage;

the control module is further configured to: when the first slave node has started up, control a second slave node in the photovoltaic power generation system to start up; and the detection module is further configured to: detect the input voltage, use the input voltage as a second voltage, and compare the first voltage with the second voltage.

In one embodiment, the string determining module is further configured to: when no superposition phenomenon occurs on the second voltage compared with the first voltage, group the first slave node and the second slave node into different photovoltaic strings; or the string determining module is further configured to: when the superposition phenomenon occurs on the second voltage compared with the first voltage, group the first slave node and the second slave node into a same photovoltaic string.

In one embodiment, the address determining module is further configured to: when a first slave node quantity is different from other slave node quantities in the configuration data, determine, from the plurality of photovoltaic strings obtained through grouping, a physical address of a photovoltaic string whose slave node quantity is equal to the first slave node quantity, as a physical address corresponding to the first slave node quantity.

In one embodiment, a voltage monitoring apparatus or a current monitoring apparatus is disposed at an output end of each photovoltaic string, and the address determining unit is further configured to determine, by using the voltage monitoring apparatus or the current monitoring apparatus, whether the corresponding photovoltaic string has an input voltage or an input current.

In one embodiment, the address determining module is further configured to set up a locating table, where the locating table includes a physical address of each photovoltaic string and a logical address of each slave node in the corresponding photovoltaic string.

In one embodiment, each slave node in the photovoltaic power generation system is corresponding to one voltage monitoring apparatus, and the voltage monitoring apparatus is configured to monitor a relative voltage between an output end of the corresponding slave node and a voltage reference point, where the voltage reference point is the ground, a positive end of a photovoltaic string, or a negative end of a photovoltaic string. The apparatus further includes:

a string division module, configured to: for each photovoltaic string, when a slave node quantity of the photovoltaic string is greater than a preset quantity, divide the photovoltaic string into a plurality of substrings, where each substring includes at least one photovoltaic power generation group, and a slave node quantity of each substring is not greater than the preset quantity; and a sorting module, configured to: for each substring in the photovoltaic string, determine, based on a monitored relative voltage of each slave node in the substring, an arrangement order of slave nodes located in the substring, where the sorting module is further configured to: for any two substrings in the photovoltaic string, control any slave node in one substring and slave nodes in the other substring to start up, and determine an ordinal position of the any slave node in the other substring based on monitored relative voltages of the slave nodes that have started up, to determine an arrangement order of slave nodes in the any two substrings and determine an arrangement order of slave nodes in the photovoltaic string; and the address determining module is further configured to determine a physical address of each slave node in the photovoltaic string based on the arrangement order of the slave nodes in the photovoltaic string.

In one embodiment, the address determining module is further configured to: when determining the physical address of each slave node, set up a locating table, where the locating table may include a logical address of each slave node and the physical address of each slave node.

In one embodiment, the control module is further configured to: for each connected slave node, control the slave node to start up and other slave nodes to shut down; and the detection module is further configured to: when determining that the input voltage of the master node is not detected, disconnect from the slave node that has started up.

According to one embodiment, a physical address determining device is provided, where the device includes a processor and a memory, the memory stores at least one instruction, and the instruction is loaded and executed by the processor to implement an operation executed in the physical address determining method according to the first aspect.

According to one embodiment, a computer readable storage medium is provided, where the storage medium stores at least one instruction, and the instruction is loaded and executed by a processor to implement an operation executed in the physical address determining method according to the first aspect.

Beneficial effects brought by the technical solutions provided in the embodiments of this disclosure are as follows:

According to the method, the apparatus, the device, and the storage medium that are provided in the embodiments of this disclosure, a manner of automatically determining a physical address of a photovoltaic string is provided, thereby implementing photovoltaic-string locating and expanding a system function range. In addition, comparison with the configuration data is performed, and for at least two equal slave node quantities, candidate photovoltaic strings matching the slave node quantities may be determined and then distinguished, thereby ensuring accuracy of locating. Moreover, a staff member does not need to manually enter a physical address of a photovoltaic string, and an operation is easy. When an anomaly occurs, the anomaly can be eliminated in a timely manner based on the determined physical address, thereby improving system stability.

In addition, comparison with the configuration data is performed, the first slave node quantity different from all the other slave node quantities is selected, and then the physical address of the photovoltaic string whose slave node quantity is equal to the first slave node quantity may be directly determined. An elimination method is used based on slave node quantities, thereby increasing a locating speed and reducing a locating time.

In addition, after the physical address is determined, the locating table is set up, and a physical address of any photovoltaic string may be quickly determined by querying the locating table. This facilitates management operations such as anomaly elimination, and repetitive locating does not need to be performed.

In addition, during slave node locating, when the slave node quantity in the photovoltaic string is greater than the preset quantity, the photovoltaic string is divided into the plurality of substrings. Internal sorting of each substring is first performed, and then external sorting is performed. In this way, the physical address of each slave node is determined. This improves sorting precision, and avoids a sorting error caused by sorting beyond a string voltage range.

In addition, the input voltage of the master node is detected when the slave node is controlled to start up. This can exclude a slave node that is not in the photovoltaic power generation system, thereby avoiding a crosstalk problem and ensuring accuracy of a subsequent locating process.

DESCRIPTION OF EMBODIMENTS

To make the objectives, technical solutions, and advantages of this disclosure clearer, the following further describes the implementations of this disclosure in detail with reference to the accompanying drawings.

Figure 1:
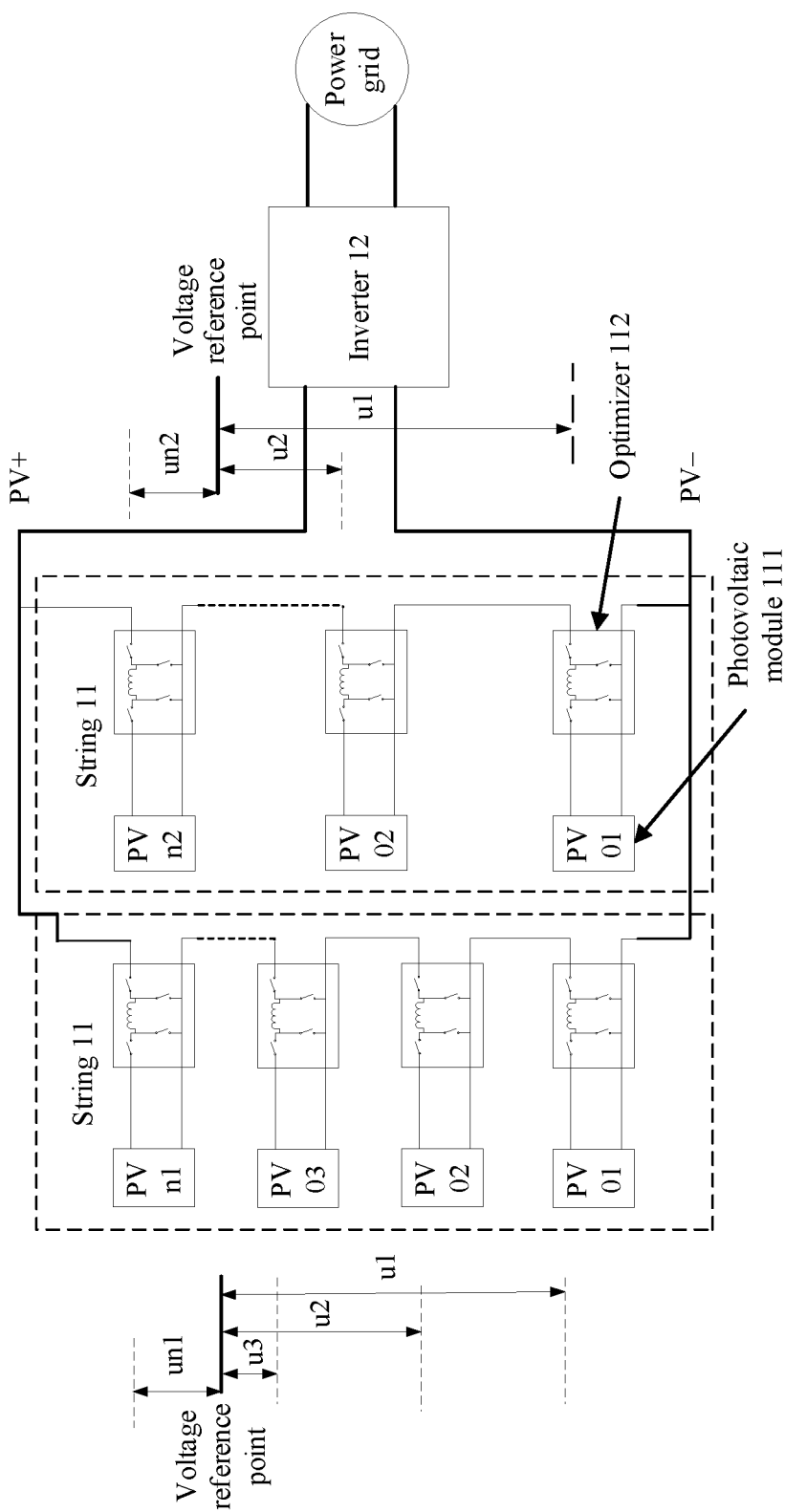
FIG. 1 is a schematic structural diagram of a photovoltaic power generation system according to a related technology.
Figure 2:
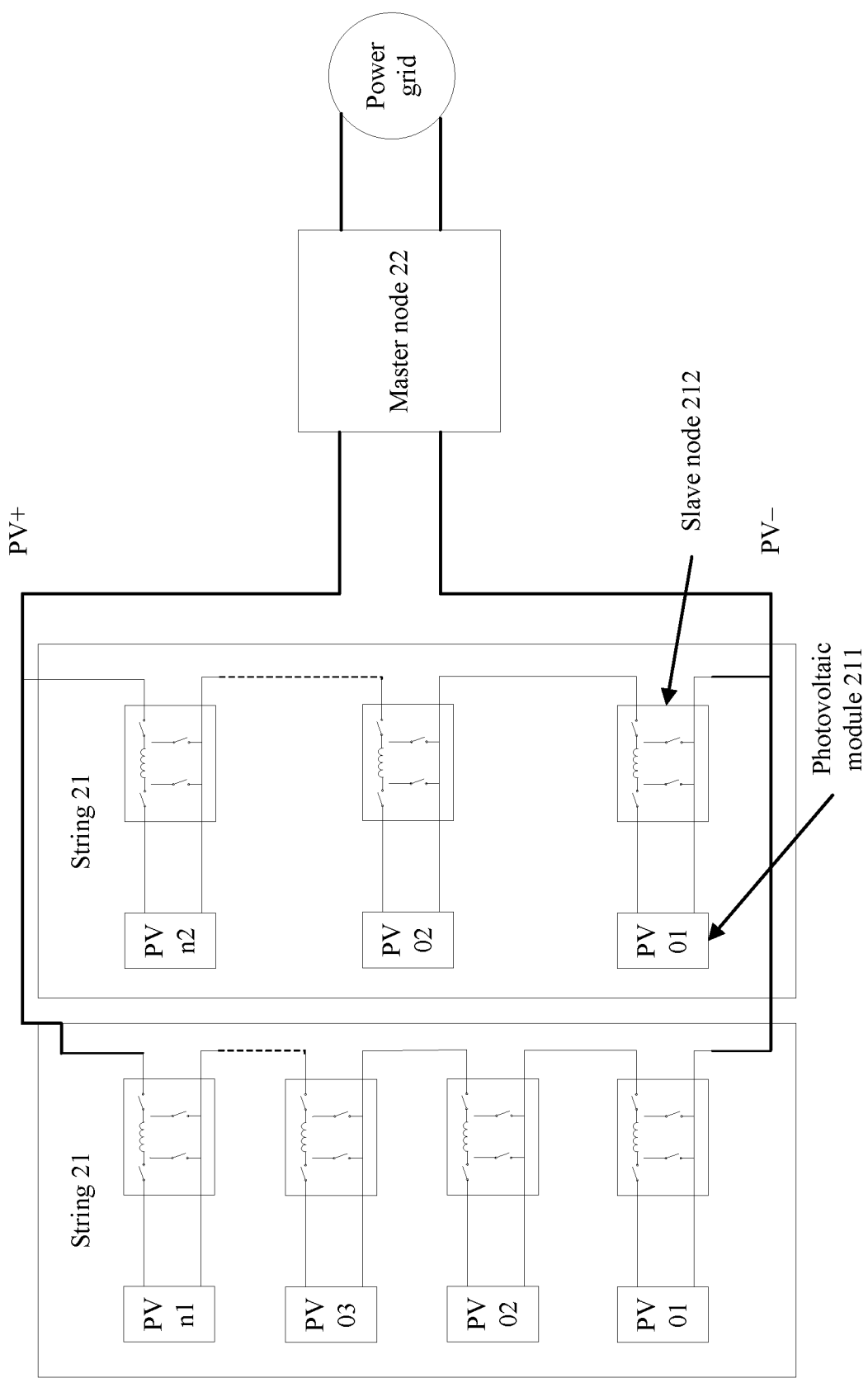
FIG. 2 is a schematic structural diagram of a photovoltaic power generation system according to an embodiment of this disclosure.

FIG. 2 is a schematic structural diagram of a photovoltaic power generation system according to an embodiment of this disclosure. Referring to FIG. 2, the photovoltaic power generation system includes a plurality of photovoltaic strings 21 and a master node 22, each photovoltaic string 21 includes at least one photovoltaic power generation group, and each photovoltaic power generation group includes one photovoltaic module 211 and one slave node 212. When any photovoltaic string 21 includes at least two photovoltaic power generation groups, the at least two photovoltaic power generation groups are connected in series. An output end of each photovoltaic string 21 (that is, an output end of a last slave node 212 in each photovoltaic string 21) is connected to an input end of the master node 22.

The master node 22 is configured to convert a direct current voltage output by the photovoltaic string 21 into an alternating current voltage, or may be further configured to monitor the photovoltaic string. The master node 22 may be an inverter, a communications box, a monitoring box, or a conversion device of another type. The slave node 212 is configured to communicate with the master node 22, and may be further configured to monitor the photovoltaic module. The slave node 212 may be an optimizer, a communications box, a monitoring box, or a communications device of another type. In this embodiment of this disclosure, the master node 22 can determine a physical address of each photovoltaic string by controlling the slave node 212 to start up or shut down and detecting an input voltage of the master node 22, thereby implementing photovoltaic-string locating.

In an embodiment, the photovoltaic power generation system further includes a voltage monitoring apparatus (not shown) corresponding to each slave node 212. The voltage monitoring apparatus is configured to monitor a relative voltage between an output end of the corresponding slave node 212 and a voltage reference point. An output end of the voltage monitoring apparatus is connected to the input end of the master node 22, and may report the monitored relative voltage to the master node 22. The master node 22 determines a physical address of the slave node in a photovoltaic string based on the monitored relative voltage.

This embodiment of this disclosure is applied to a scenario of monitoring the photovoltaic power generation system. A physical address of a photovoltaic string and a physical address of a slave node in the photovoltaic string are determined, thereby implementing precise locating. When an anomaly occurs in a photovoltaic string or in a slave node, an apparatus in which the anomaly occurs can be located in a timely manner based on the determined physical address, thereby eliminating the anomaly in a timely manner.

Figure 3:
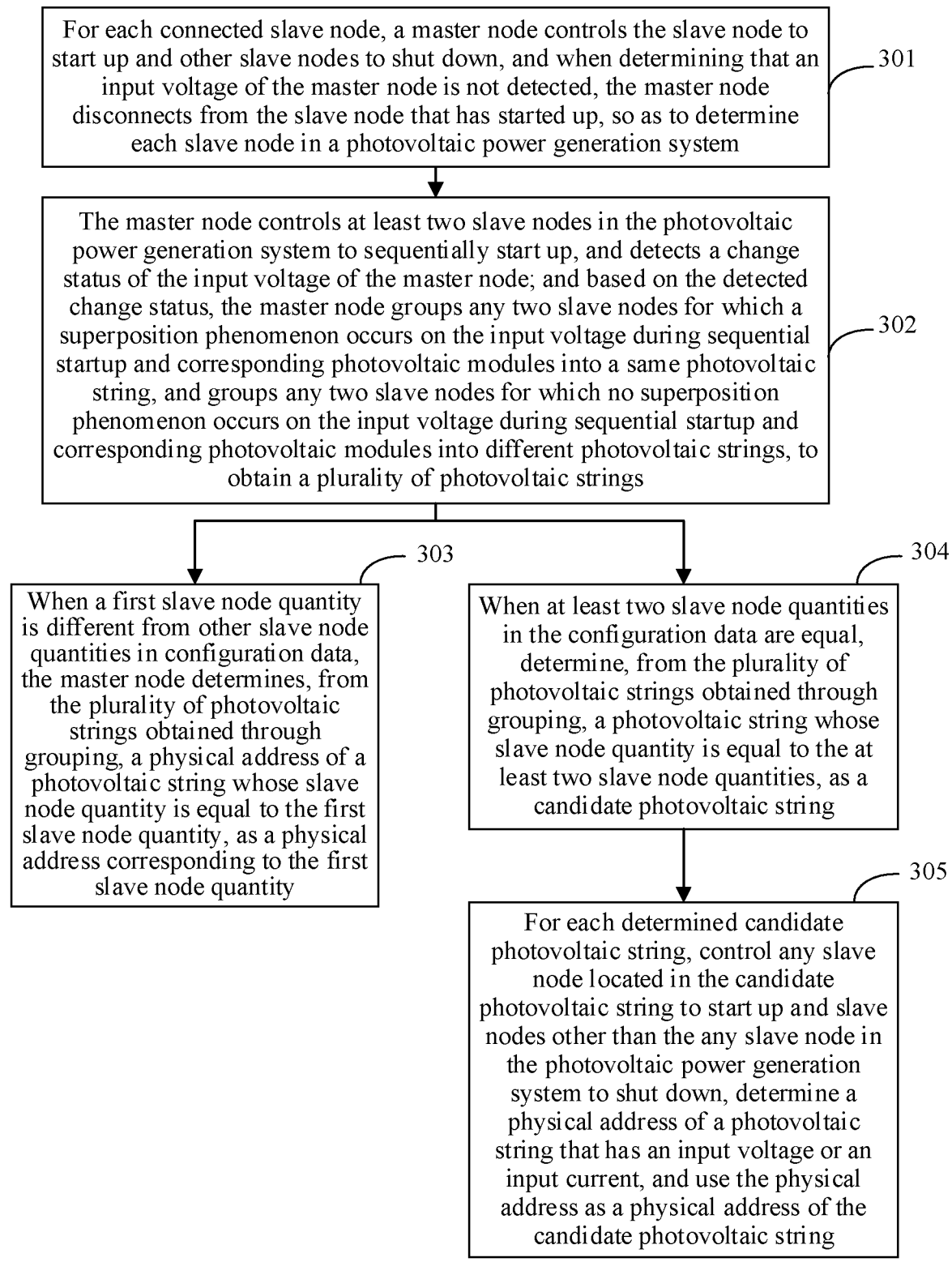
FIG. 3 is a flowchart of a physical address determining method according to an embodiment of this disclosure.

Based on the foregoing embodiment shown in FIG. 2, this disclosure provides a physical address determining method. FIG. 3 is a flowchart of a physical address determining method according to an embodiment of this disclosure, and describes a process in which a master node determines a physical address of a photovoltaic string. Referring to FIG. 3, the method includes the following blocks.

301: For each connected slave node, a master node controls the slave node to start up and other slave nodes to shut down, and when determining that an input voltage of the master node is not detected, the master node disconnects from the slave node that has started up, to determine each slave node in a photovoltaic power generation system.

During building of the photovoltaic power generation system, a photovoltaic module is connected to a slave node to constitute a group, and a plurality of groups are connected in series to constitute a photovoltaic string. A plurality of photovoltaic strings may be obtained by repeating this block. An output end of each photovoltaic string is connected to an input end of the master node, to constitute the photovoltaic power generation system. In addition, when each slave node in the photovoltaic power generation system is networked with the master node, the master node may identify a logical address of each slave node, and establish a communications connection to a corresponding slave node based on the logical address of each slave node. Then, the master node can communicate with any slave node based on a logical address of the corresponding slave node, for example, send an instruction to the slave node and control the slave node to start up or shut down. The logical address may be a media access control (MAC) address or another communication address.

However, in an actual networking process, a communications connection may be established between a slave node not included in the photovoltaic power generation system and the master node. As a result, the slave node not in the photovoltaic power generation system is networked, causing a crosstalk problem. To avoid the crosstalk problem, after networking is completed, the master node may traverse each connected slave node, control a traversed slave node to start up and slave nodes other than the traversed slave node to shut down, and detect the input voltage of the master node. If the slave node is located in the photovoltaic power generation system, the slave node provides an input voltage to the master node when starting up. In this case, the input voltage of the master node is normal. If the slave node is not located in the photovoltaic power generation system, the slave node provides no input voltage to the master node when starting up. In this case, the slave nodes in the photovoltaic power generation system have shut down, and therefore provide no input voltage to the master node, either. As a result, the input voltage of the master node is abnormal, and the input voltage cannot be detected.

Therefore, when the traversed slave node starts up and the slave nodes other than the traversed slave node shut down, if it is determined that the input voltage of the master node is not detected, it indicates that the traversed slave node is not located in the photovoltaic power generation system. Therefore, a communications connection to the traversed slave node is disconnected, so that the slave node is excluded. The foregoing block is repeated for each slave node, so that all slave nodes not in the photovoltaic power generation system can be excluded, and only slave nodes in the photovoltaic power generation system remain.

302: The master node controls at least two slave nodes in the photovoltaic power generation system to sequentially start up, and detects a change status of the input voltage of the master node. Based on the detected change status, the master node groups any two slave nodes for which a superposition phenomenon occurs on the input voltage during sequential startup and corresponding photovoltaic modules into a same photovoltaic string, and groups any two slave nodes for which no superposition phenomenon occurs on the input voltage during sequential startup and corresponding photovoltaic modules into different photovoltaic strings, to obtain a plurality of photovoltaic strings.

In this embodiment of this disclosure, to implement photovoltaic-string locating, photovoltaic modules and slave nodes in the photovoltaic power generation system should be grouped first, to obtain a plurality of photovoltaic strings. Slave nodes located in a same photovoltaic string are connected in series, and when the slave nodes all start up, the superposition phenomenon consequently occurs on the input voltage of the master node. In contrast, slave nodes in different photovoltaic strings are connected in parallel, and when the slave nodes all start up, the superposition phenomenon does not occur on the input voltage of the master node. The superposition phenomenon is a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude. A numerical span of the preset neighborhood range may be determined based on precision. If the amplitude increment in the input voltage is within the preset neighborhood range of the unit amplitude, it indicates that the amplitude increment in the input voltage is equal to or approximately equal to the unit amplitude. For example, in a case in which one slave node has started up, when another slave node starts up, the amplitude increment in the input voltage of the master node is equal to or approximately equal to the unit amplitude, that is, the input voltage of the master node is approximately twice an original input voltage. Alternatively, in a case in which two slave nodes have started up, when another slave node starts up, the amplitude increment in the input voltage of the master node is equal to or approximately equal to the unit amplitude, that is, the input voltage of the master node is approximately 3/2 of an original input voltage.

Therefore, the master node may select at least two slave nodes from the photovoltaic power generation system, control the selected at least two slave nodes to sequentially start up, and may determine, by detecting the change status of the input voltage of the master node, slave nodes that belong to a same photovoltaic string and slave nodes that belong to different photovoltaic strings, and further group slave nodes and photovoltaic modules corresponding to the slave nodes into a plurality of photovoltaic strings.

A first slave node and a second slave node are used as an example. The master node controls the first slave node to start up. At this moment, the second slave node is in a shutdown state. The first slave node provides a voltage to the master node. The master node detects the input voltage at this moment, and uses the input voltage as a first voltage. Then, when the first slave node has started up, the master node controls the second slave node to start up, detects the input voltage at this moment, uses the input voltage as a second voltage, and compares the first voltage with the second voltage.

When no superposition phenomenon occurs on the second voltage compared with the first voltage, it indicates that the second slave node and the first slave node are in a parallel relationship. In other words, the second slave node and the first slave node are located in different photovoltaic strings. Therefore, the first slave node and the second slave node are grouped into different photovoltaic strings. When the superposition phenomenon occurs on the second voltage compared with the first voltage, it indicates that the second slave node and the first slave node are connected in series. In other words, the first slave node and the first slave node are located in a same photovoltaic string. Therefore, the first slave node and the second slave node are grouped into the same photovoltaic string.

Through repetition of the foregoing photovoltaic string grouping manner, all slave nodes in photovoltaic strings can be grouped into a plurality of photovoltaic strings, and a photovoltaic module corresponding to each slave node is also grouped into a photovoltaic string in which the slave node is located.

In a process of repetitive grouping, a specified slave node may be first selected. The specified slave node is used as a reference. When the specified slave node is controlled to start up, whether another slave node and the specified slave node are located in a same photovoltaic string is determined by controlling the another slave node to start up. In this way, a photovoltaic string that includes the specified slave node and a photovoltaic string that does not include the specified slave node are obtained through grouping. A next specified slave node is further selected from the photovoltaic string that does not include the specified slave node, and grouping is continued until all the slave nodes are grouped.

Figure 4A:
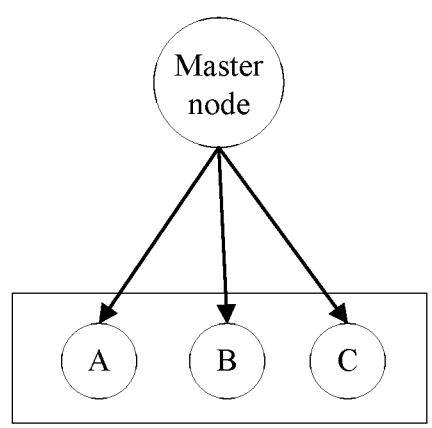
FIG. 4A is a schematic diagram of a slave node in a photovoltaic power generation system according to an embodiment of this disclosure.
Figure 4B:
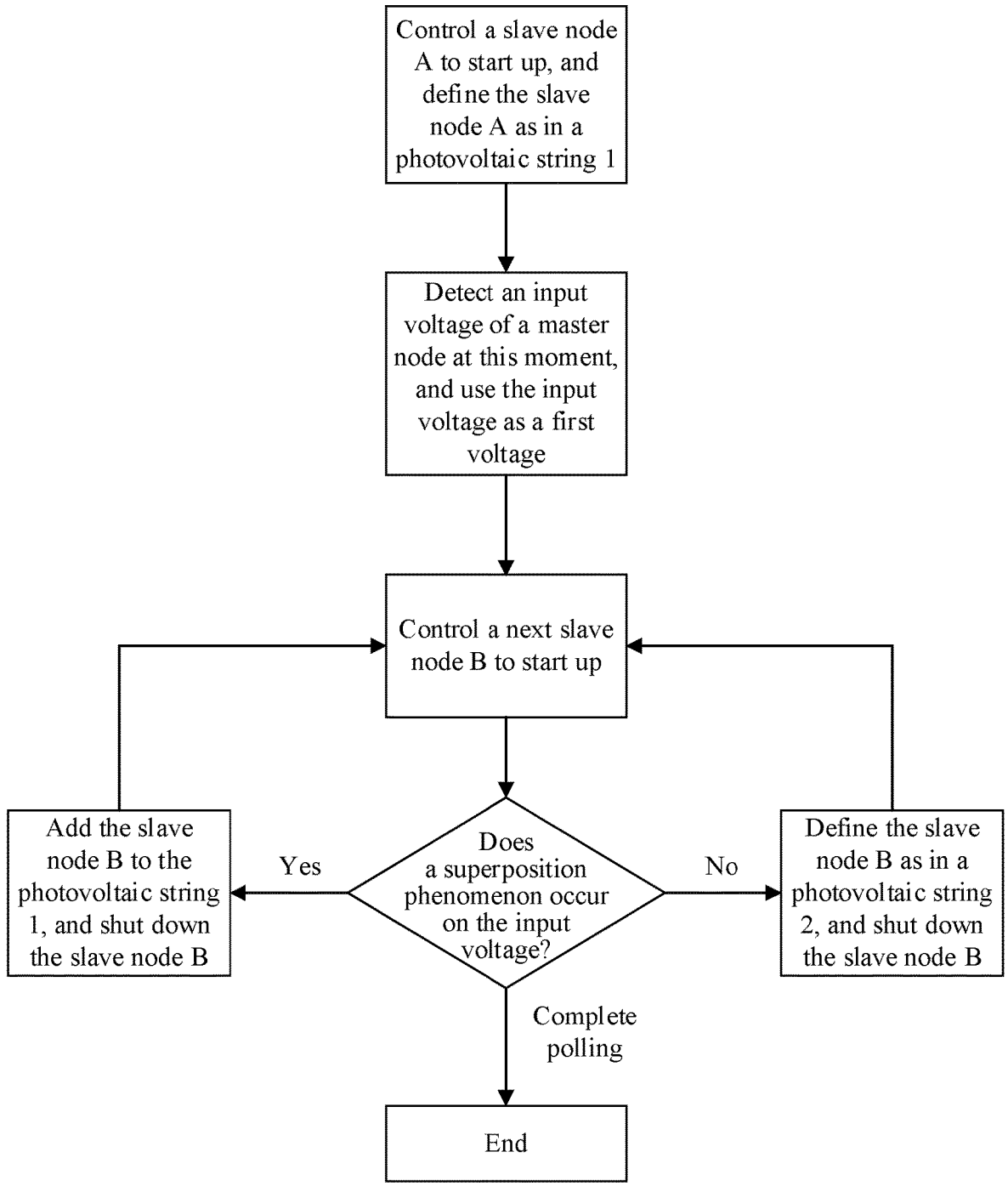
FIG. 4B is a schematic flowchart of grouping a photovoltaic string according to an embodiment of this disclosure.

For example, referring to FIG. 4A, a photovoltaic power generation system includes three slave nodes, and logical addresses of the three slave nodes are A, B, and C. Referring to FIG. 4B, during photovoltaic string grouping based on the photovoltaic power generation system shown in FIG. 4A, a master node controls the slave node A to start up, defines the slave node A as in a photovoltaic string 1, detects an input voltage of the master node at this moment, and uses the input voltage as a first voltage. Then, the master node controls the next slave node B to start up, detects an input voltage of the master node at this moment, and uses the input voltage as a second voltage. When the second voltage is equal or close to the first voltage, the slave nodes A and B are located in different photovoltaic strings, and the slave node B is defined as in a photovoltaic string 2. When the second voltage is approximately twice the first voltage, the slave nodes A and B are located in a same photovoltaic string, and the slave node B is added to the photovoltaic string 1. Then, the master node controls the slave node B to shut down, and continues to select the next slave node C. This process does not end until polling of all slave nodes is completed. In this way, a plurality of photovoltaic strings are obtained through grouping.

Alternatively, the master node may select any two slave nodes each time, and determine whether the two slave nodes are located in a same photovoltaic string. After all slave nodes are selected, analysis is performed based on determining results of slave nodes selected for a plurality of times, to determine a plurality of photovoltaic strings.

For example, during photovoltaic string grouping based on the photovoltaic power generation system shown in FIG. 4A, the master node first selects the slave nodes A and B, controls the slave node A to start up, detects an input voltage of the master node at this moment, uses the input voltage as a first voltage, and defines the slave node A as a photovoltaic string 1. Then, the master node controls the slave node B to start up, detects an input voltage of the master node at this moment, and uses the input voltage as a second voltage. If it is determined that the second voltage is equal or close to the first voltage, the slave nodes A and B are located in different photovoltaic strings, and the slave node B is defined as in a photovoltaic string 2. Then, the master node selects the slave nodes A and C, controls the slave node A to start up, detects an input voltage of the master node at this moment, and uses the input voltage as a third voltage. Then, the master node controls the slave node A to shut down, controls the slave node C to start up, detects an input voltage of the master node at this moment, and uses the input voltage as a fourth voltage. If it is determined that the second voltage is equal or close to the first voltage, the slave nodes A and C are located in a same photovoltaic string, and the slave node C is added to the photovoltaic string 1.

303: When a first slave node quantity is different from other slave node quantities in configuration data, the master node determines, from the plurality of photovoltaic strings obtained through grouping, a physical address of a photovoltaic string whose slave node quantity is equal to the first slave node quantity, as a physical address corresponding to the first slave node quantity.

The configuration data includes a slave node quantity and a physical address that are already configured for each photovoltaic string. A physical address of a photovoltaic string may represent a physical location at which the corresponding photovoltaic string is located. The corresponding photovoltaic string may be found based on the physical address. The physical address of the photovoltaic string may be indicated by an ordinal position of the photovoltaic string in the plurality of photovoltaic strings, or may be a unique number allocated to the photovoltaic string, or the like.

For example, the configuration data may be shown in Table 1 below, including physical addresses and corresponding slave node quantities, and indicating that a photovoltaic string 1 includes three slave nodes, a photovoltaic string 2 includes two slave nodes, and a photovoltaic string 3 includes three slave nodes.

TABLE 1

| Physical address | Slave node quantity |
|---|---|
| ADD1 | 3 |
| ADD2 | 2 |
| ADD3 | 3 |

After performing the foregoing blocks 301 and 302, the master node obtains the plurality of photovoltaic strings through grouping, and determines a slave node in each photovoltaic string. Therefore, a slave node quantity of each photovoltaic string may be calculated. However, a physical address of each photovoltaic string has not yet been determined. Actually, the photovoltaic power generation system is obtained through networking based on the configuration data, and both the slave node quantity and physical address of each photovoltaic string should match the configuration data. Therefore, after a slave node quantity in a photovoltaic string obtained through grouping is compared with slave node quantities in the configuration data, a specific photovoltaic string and a specific physical address of the photovoltaic string that is obtained through grouping are determined.

Block 303 is a first case. When the first slave node quantity is different from the other slave node quantities of photovoltaic strings in the configuration data, it indicates that there is only one photovoltaic string, in the photovoltaic power generation system, whose slave node quantity is the first slave node quantity. Therefore, from the plurality of photovoltaic strings obtained through grouping, the physical address of the photovoltaic string whose slave node quantity is equal to the first slave node quantity is determined as the physical address corresponding to the first slave node quantity. This implements a one-to-one correspondence between a photovoltaic string and a physical address.

Based on the example in Table 1 above, it is assumed that three photovoltaic strings, namely {A1, A2, A3}, {B1, B2}, and {C1, C2, C3}, are obtained through grouping. When a slave node quantity in the second photovoltaic string obtained through grouping is 2, it may be determined that the photovoltaic string {B1, B2} is a second photovoltaic string in Table 1, and a physical address of the photovoltaic string {B1, B2} is ADD2.

304: When at least two slave node quantities in the configuration data are equal, determine, from the plurality of photovoltaic strings obtained through grouping, a photovoltaic string whose slave node quantity is equal to the at least two slave node quantities, as a candidate photovoltaic string.

305: For each determined candidate photovoltaic string, control any slave node located in the candidate photovoltaic string to start up and slave nodes other than the any slave node in the photovoltaic power generation system to shut down, determine a physical address of a photovoltaic string that has an input voltage or an input current, and use the physical address as a physical address of the candidate photovoltaic string.

Blocks 304 and 305 are a second case. When at least two slave node quantities in the configuration data are equal, it indicates that there are photovoltaic strings with a same slave node quantity in the photovoltaic power generation system. These photovoltaic strings should be further distinguished.

Therefore, the photovoltaic string whose slave node quantity is equal to the slave node quantities of at least two photovoltaic strings is first determined from the plurality of photovoltaic strings obtained through grouping, as the candidate photovoltaic string. For each determined candidate photovoltaic string, the any slave node located in the candidate photovoltaic string is controlled to start up, and the slave nodes other than the any slave node in the photovoltaic power generation system are controlled to shut down. In this case, the photovoltaic string in which the slave node that has started up is located has an input voltage or an input current. Therefore, the master node may detect the physical address of the photovoltaic string that has the input voltage or the input current, and use the physical address as the physical address of the candidate photovoltaic string. Each candidate photovoltaic string may be traversed in the foregoing manner, so that a physical address of each candidate photovoltaic string is further determined. This implements a one-to-one correspondence between a photovoltaic string and a physical address.

Based on the example in Table 1 above, it is assumed that three photovoltaic strings, namely {A1, A2, A3}, {B1, B2}, and {C1, C2, C3}, are obtained through grouping. Both slave node quantities of the two photovoltaic strings {A1, A2, A3} and {C1, C2, C3} are 3. In this case, a slave node in the first photovoltaic string {A1, A2, A3} is controlled to start up, and other slave nodes are controlled to shut down. The master node detects that a physical address of a photovoltaic string that has an input voltage is ADD1. Therefore, it can be determined that a physical address of the photovoltaic string {A1, A2, A3} is ADD1, and a physical address of the photovoltaic string {C1, C2, C3} is ADD2.

Figure 4C:
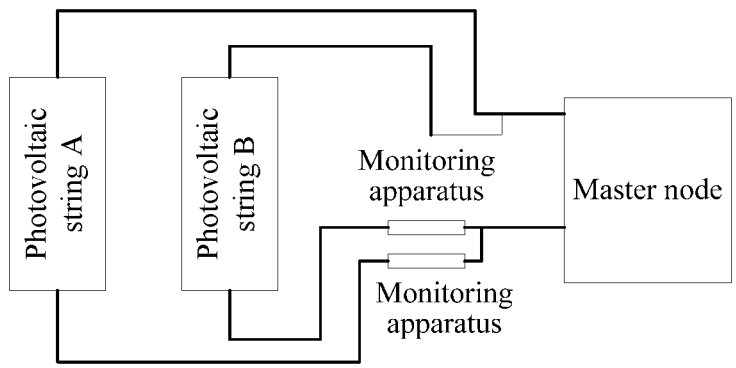
FIG. 4C is a schematic diagram of a monitoring apparatus according to an embodiment of this disclosure.

Referring to FIG. 4C, a monitoring apparatus, such as a voltage monitoring apparatus or a current monitoring apparatus, may be disposed at an output end of each photovoltaic string. In this case, the master node may determine, by using the voltage monitoring apparatus or the current monitoring apparatus, whether the corresponding photovoltaic string has an input voltage or an input current.

In actual application, when a physical address of a photovoltaic string is determined, a locating table may be set up. The locating table may include a physical address of each photovoltaic string and a logical address of a slave node in the photovoltaic string. Based on the foregoing example, the locating table may be shown in Table 2 below, indicating that the photovoltaic string 1 includes slave nodes A1, A2, and A3, the photovoltaic string 2 includes slave nodes B1 and B2, and the photovoltaic string 3 includes slave nodes C1, C2, and C3.

TABLE 2

| Physical address | Logical address of a slave node |
| --- | --- |
| ADD1 | A1, A2, A3 |
| ADD2 | B1, B2 |
| ADD3 | C1, C2, C3 |

According to the method provided in this embodiment of this disclosure, a manner of automatically determining a physical address of a photovoltaic string is provided, thereby implementing photovoltaic-string locating and expanding a system function range. Moreover, a staff member does not need to manually enter a physical address of a photovoltaic string, and an operation is easy. When an abnormal case occurs, the abnormal case can be eliminated in a timely manner based on the determined physical address, thereby improving system stability.

Figure 5A:
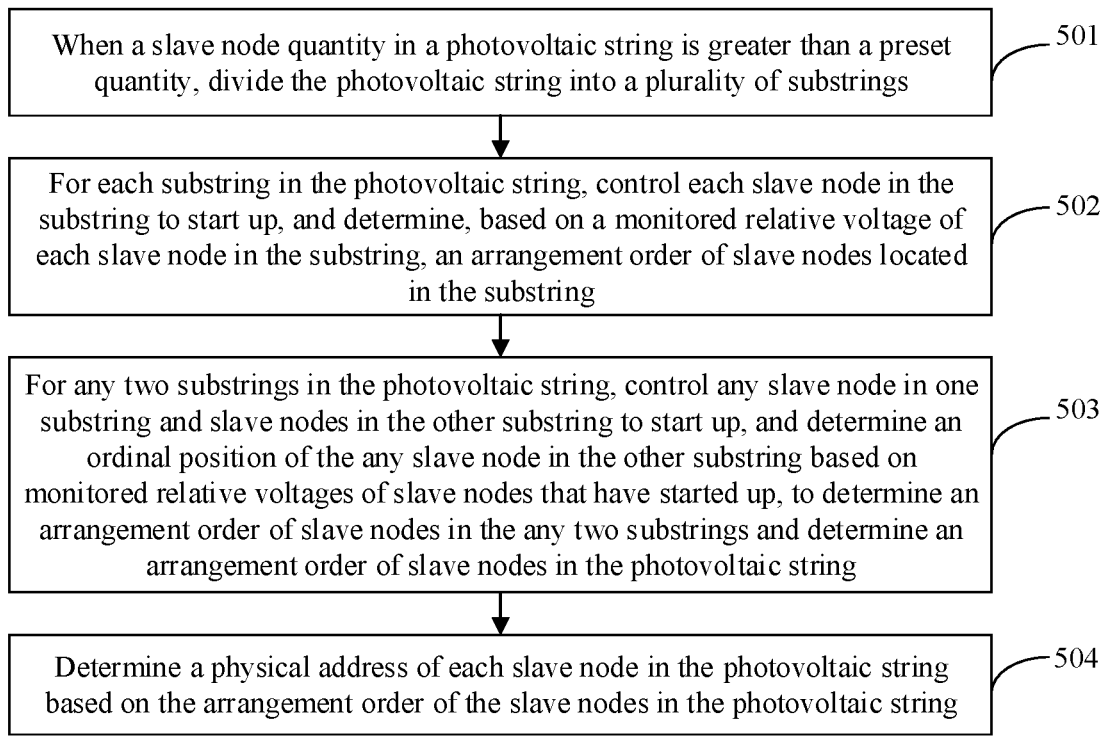
FIG. 5A is a flowchart of a physical address determining method according to an embodiment of this disclosure.

Based on the foregoing embodiment shown in FIG. 2 and FIG. 3, this disclosure further provides a physical address determining method. FIG. 5A is a flowchart of a physical address determining method according to an embodiment of this disclosure, and describes a process in which a master node determines a physical address of a slave node in a photovoltaic string. Referring to FIG. 5A, the method includes the following blocks.

501: When a slave node quantity in a photovoltaic string is greater than a preset quantity, divide the photovoltaic string into a plurality of substrings, where each substring includes at least one photovoltaic power generation group, and a slave node quantity of each substring is not greater than the preset quantity.

A plurality of slave nodes in a photovoltaic string are connected in series, and perform voltage division based on a string voltage range of the entire photovoltaic string. If the photovoltaic string includes an excessively large quantity of slave nodes, a voltage at an output end of each slave node is quite low after the voltage division. Consequently, sampling precision may be easily affected during detection, resulting in inaccurate identification of a physical address.

In view of this, the slave node quantity in the photovoltaic string is first obtained, and whether the slave node quantity is greater than the preset quantity is determined. If the slave node quantity is greater than the preset quantity, it indicates that the photovoltaic string includes a relatively large quantity of slave nodes. In this case, the photovoltaic string may be divided, to obtain the plurality of substrings. It is ensured that the slave node quantity of each substring is not greater than the preset quantity. The preset quantity may be determined based on the string voltage range, or may be determined in another manner.

For example, the preset quantity is 4, and the photovoltaic string includes 10 slave nodes: A1, A2, A3, , and A10. The 10 slave nodes are grouped into three substrings: {A1, A2, A3}, {A4, A5, A6}, and {A7, A8, A9, A10}.

502: For each substring in the photovoltaic string, control each slave node in the substring to start up, and determine, based on a monitored relative voltage of each slave node in the substring, an arrangement order of slave nodes located in the substring.

Figure 5B:
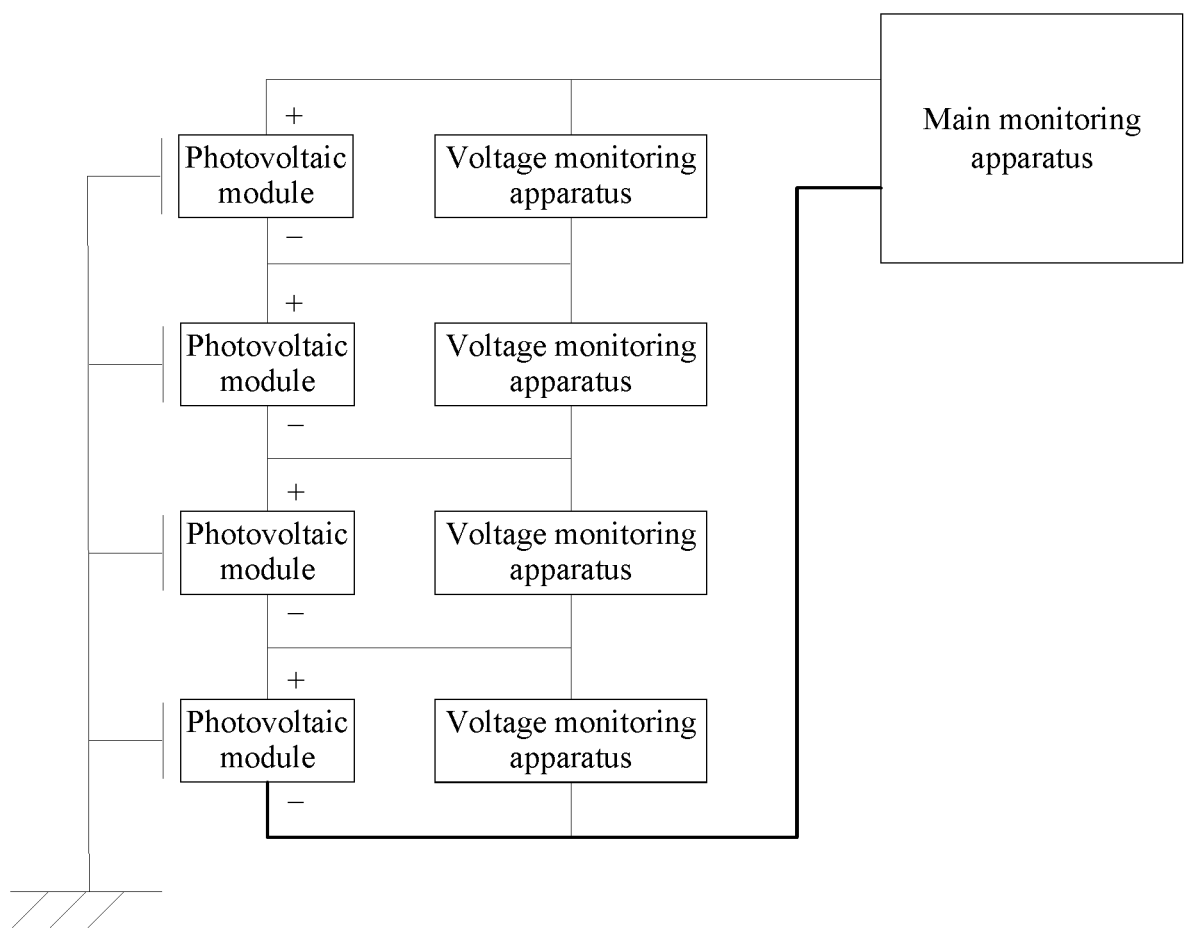
FIG. 5B is a schematic diagram of a voltage monitoring apparatus according to an embodiment of this disclosure.

In this embodiment of this disclosure, referring to FIG. 5B, for ease of voltage monitoring, a corresponding voltage monitoring apparatus may be disposed for each slave node. A relative voltage between an output end of each slave node and a voltage reference point may be monitored by using a voltage monitoring apparatus corresponding to the slave node. For example, the voltage reference point may be the ground, and a voltage of the ground is 0. A voltage between the output end of each slave node and the ground, that is, a relative voltage, may be monitored by using the voltage monitoring apparatus. Alternatively, the voltage reference point may be a positive end of a photovoltaic string, a negative end of a photovoltaic string, or the like.

A main monitoring apparatus may be further disposed in the photovoltaic power generation system. The main monitoring apparatus may be connected to each voltage monitoring apparatus, and is configured to receive a relative voltage monitored by each voltage monitoring apparatus.

The main monitoring apparatus may be the master node. Alternatively, the main monitoring apparatus may be an apparatus connected to the master node, and may send a collected relative voltage of each slave node to the master node.

For each substring, because a photovoltaic string is constituted by connecting positive and negative ends of a plurality of slave nodes (that is, connecting a positive end of one slave node to a negative end of another slave node) in series, a relative voltage of a slave node gradually increases from a negative end of the photovoltaic string to a positive end of the photovoltaic string, and a relative voltage of a slave node gradually decreases from the positive end of the photovoltaic string to the negative end of the photovoltaic string. Therefore, a magnitude of a relative voltage may indicate an ordinal position of a slave node in a substring. The master node may control each slave node in a current substring to start up and another slave node in the substring to shut down, and determine an arrangement order of all the slave nodes in the current substring based on a monitored relative voltage of each slave node. By analogy, internal sorting of all substrings may be completed by using the foregoing sorting method.

For example, in the photovoltaic string {A1, A2, A3}, A1 has a highest relative voltage, and A2 has a lowest relative voltage. Therefore, it can be determined that an arrangement order of the slave nodes is A1-A3-A2 from a positive end of the photovoltaic string to a negative end of the photovoltaic string.

503: For any two substrings in the photovoltaic string, control any slave node in one substring and slave nodes in the other substring to start up, and determine an ordinal position of the any slave node in the other substring based on monitored relative voltages of the slave nodes that have started up, to determine an arrangement order of slave nodes in the any two substrings and determine an arrangement order of slave nodes in the photovoltaic string.

A first substring and a second substring are used as an example. First, a specified slave node in the first substring may be controlled to start up, and another slave node in the first substring may be controlled to shut down. In addition, all slave nodes in the second substring are controlled to start up. Then, relative voltages of the slave nodes that have started up are monitored, so that an ordinal position of the specified slave node in the second substring can be determined. Subsequently, a next specified slave node is selected from the first substring. An ordinal position of the next specified slave node in the second substring is also determined in the foregoing sorting manner. By analogy, an arrangement order of all slave nodes in the first substring and the second substring may be determined, thereby implementing external sorting of the first substring and the second substring.

Correspondingly, any two substrings may be "combined" in the foregoing external sorting manner. By analogy, all substrings in a photovoltaic string may be combined, so as to determine an arrangement order of all slave nodes in all the substrings, that is, an arrangement order of all slave nodes in the photovoltaic string.

504: Determine a physical address of each slave node in the photovoltaic string based on the arrangement order of the slave nodes in the photovoltaic string.

After the arrangement order of all the slave nodes is determined, the physical address of each slave node may be determined based on the arrangement order of all the slave nodes according to a physical address determining rule. A plurality of types of determining rules may be included, provided that physical addresses allocated based on different arrangement orders are different.

In a possible implementation, when the physical address of each slave node is indicated by an ordinal position of the slave node in the photovoltaic string, the ordinal position of the slave node may be directly used as the physical address of the slave node. For example, a physical address of a slave node ranked first is set to 01.

In another possible implementation, when the physical address of each slave node is indicated by a physical address of the photovoltaic string in which the slave node is located and an ordinal position of the slave node in the photovoltaic string, the physical address of the photovoltaic string in which the slave node is located and the ordinal position of the slave node in the photovoltaic string may be obtained and used as the physical address of the slave node. For example, a physical address of a slave node ranked first in a photovoltaic string 1 is set to 1-01, and a physical address of a slave node ranked first in a photovoltaic string 2 is set to 2-01.

In actual application, when the physical address of each slave node is determined, a locating table may be set up. The locating table may include a logical address of each slave node and the physical address of each slave node. For example, the locating table may be shown in Table 3 below.

TABLE 3

| Logical address | Physical address |
| --- | --- |
| A1 | 1-01 |
| A2 | 1-02 |
| A3 | 1-03 |

According to the method provided in this embodiment of this disclosure, because a sorting process is relatively complicated when a photovoltaic string includes an excessively large quantity of slave nodes, when the slave node quantity in the photovoltaic string is greater than the preset quantity, the photovoltaic string is divided into the plurality of substrings in a manner of "dividing a long string into short substrings". Internal sorting of each substring is first performed, and then external sorting is performed. In this way, the physical address of each slave node is determined. This improves sorting precision, and avoids a sorting error caused by sorting beyond a string voltage range.

Figure 6:
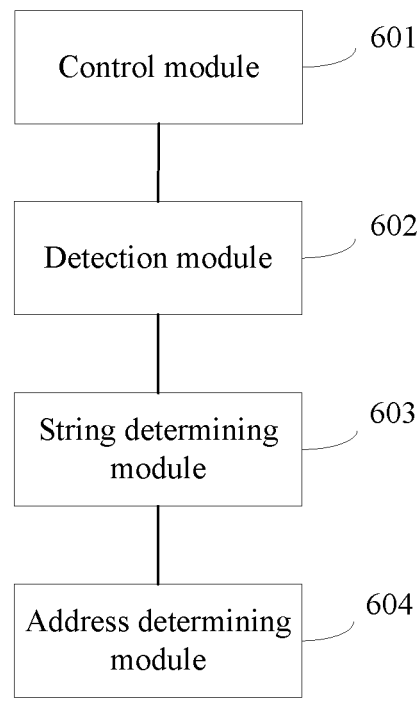
FIG. 6 is a schematic structural diagram of a physical address determining apparatus according to an embodiment of this disclosure.

FIG. 6 is a schematic structural diagram of a physical address determining apparatus according to an embodiment of this disclosure. Referring to FIG. 6, the apparatus is applied to the photovoltaic power generation system described in the foregoing embodiment, and the apparatus includes:

a control module 601, configured to control at least two slave nodes in the photovoltaic power generation system to sequentially start up;

a detection module 602, configured to detect a change status of an input voltage of a master node when the at least two slave nodes are controlled to sequentially start up;

a string determining module 603, configured to: based on the detected change status, group any two slave nodes for which a superposition phenomenon occurs on the input voltage during sequential startup and corresponding photovoltaic modules into a same photovoltaic string, and group any two slave nodes for which no superposition phenomenon occurs on the input voltage during sequential startup and corresponding photovoltaic modules into different photovoltaic strings, to obtain a plurality of photovoltaic strings, where the superposition phenomenon is a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude; and an address determining module 604, configured to: when at least two slave node quantities in configuration data are equal, determine, from the plurality of photovoltaic strings obtained through grouping, a photovoltaic string whose slave node quantity is equal to the at least two slave node quantities, as a candidate photovoltaic string, where the configuration data includes a slave node quantity of each photovoltaic string and a physical address of each photovoltaic string; and for each determined candidate photovoltaic string, control any slave node located in the candidate photovoltaic string to start up and slave nodes other than the any slave node in the photovoltaic power generation system to shut down, determine a physical address of a photovoltaic string that has an input voltage or an input current, and use the physical address as a physical address of the candidate photovoltaic string.

In a first possible implementation, the control module 601 is configured to control a first slave node in the photovoltaic power generation system to start up;

the detection module 602 is configured to: when the first slave node is controlled to start up, detect the input voltage, and use the input voltage as a first voltage;

the control module 601 is further configured to: when the first slave node has started up, control a second slave node in the photovoltaic power generation system to start up; and the detection module 602 is further configured to: detect the input voltage, use the input voltage as a second voltage, and compare the first voltage with the second voltage.

In a second possible implementation, the string determining module 603 is further configured to: when no superposition phenomenon occurs on the second voltage compared with the first voltage, group the first slave node and the second slave node into different photovoltaic strings; or the string determining module 603 is further configured to: when the superposition phenomenon occurs on the second voltage compared with the first voltage, group the first slave node and the second slave node into a same photovoltaic string.

In a third possible implementation, the address determining module 604 is further configured to: when a first slave node quantity is different from other slave node quantities in the configuration data, determine, from the plurality of photovoltaic strings obtained through grouping, a physical address of a photovoltaic string whose slave node quantity is equal to the first slave node quantity, as a physical address corresponding to the first slave node quantity.

In a fourth possible implementation, a voltage monitoring apparatus or a current monitoring apparatus is disposed at an output end of each photovoltaic string, and the address determining unit is further configured to determine, by using the voltage monitoring apparatus or the current monitoring apparatus, whether the corresponding photovoltaic string has an input voltage or an input current.

In a fifth possible implementation, the address determining module 604 is further configured to set up a locating table, where the locating table includes a physical address of each photovoltaic string and a logical address of each slave node in the corresponding photovoltaic string.

In a sixth possible implementation, each slave node in the photovoltaic power generation system is corresponding to one voltage monitoring apparatus, and the voltage monitoring apparatus is configured to monitor a relative voltage between an output end of the corresponding slave node and a voltage reference point, where the voltage reference point is the ground, a positive end of a photovoltaic string, or a negative end of a photovoltaic string. The apparatus further includes:

a string division module, configured to: for each photovoltaic string, when a slave node quantity of the photovoltaic string is greater than a preset quantity, divide the photovoltaic string into a plurality of substrings, where each substring includes at least one photovoltaic power generation group, and a slave node quantity of each substring is not greater than the preset quantity; and a sorting module, configured to: for each substring in the photovoltaic string, determine, based on a monitored relative voltage of each slave node in the substring, an arrangement order of all slave nodes located in the substring.

The sorting module is further configured to: for any two substrings in the photovoltaic string, control any slave node in one substring and slave nodes in the other substring to start up, and determine an ordinal position of the any slave node in the other substring based on monitored relative voltages of the slave nodes that have started up, to determine an arrangement order of slave nodes in the any two substrings and determine an arrangement order of slave nodes in the photovoltaic string.

The address determining module 604 is further configured to determine a physical address of each slave node in the photovoltaic string based on the arrangement order of the slave nodes in the photovoltaic string.

In a seventh possible implementation, the address determining module 604 is further configured to: when determining the physical address of each slave node, set up a locating table, where the locating table may include a logical address of each slave node and the physical address of each slave node.

In an eighth possible implementation, the control module 601 is further configured to: for each connected slave node, control the slave node to start up and other slave nodes to shut down; and the detection module 602 is further configured to: when determining that the input voltage of the master node is not detected, disconnect from the slave node that has started up.

It should be noted that when the physical address determining apparatus provided in the foregoing embodiment determines a physical address, division of the functional modules is used merely as an example for description. In actual application, depending on a requirement, the functions may be allocated to different functional modules for implementation, that is, an internal structure of the master node is divided into different functional modules to implement all or some of the functions described above. In addition, the physical address determining apparatus provided in the foregoing embodiment pertains to a same idea as the embodiments of the physical address determining method. For a specific implementation process of the physical address determining apparatus, refer to the method embodiments, and details are not described herein again.

Figure 7:
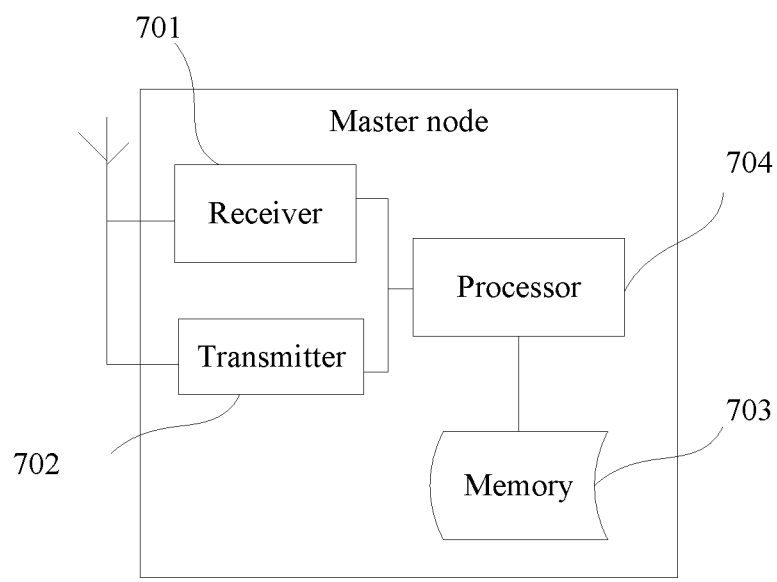
FIG. 7 is a schematic structural diagram of a master node according to an embodiment of this disclosure.

FIG. 7 is a schematic structural diagram of a master node according to an embodiment of this disclosure. Referring to FIG. 7, the master node includes a receiver 701, a transmitter 702, a memory 703, and a processor 704. The receiver 701, the transmitter 702, and the memory 703 are separately connected to the processor 704. The memory 703 stores at least one instruction. The processor 704 is configured to load and execute the at least one instruction, to implement an operation executed by the master node in the foregoing embodiments.

An embodiment of this disclosure further provides a computer readable storage medium. The computer readable storage medium stores at least one instruction. The at least one instruction is loaded and executed by a processor to implement an operation executed by the master node in the foregoing embodiments.

A person of ordinary skill in the art may understand that all or some of the blocks of the foregoing embodiments may be implemented by hardware or a program instructing related hardware. The program may be stored in a computer readable storage medium. The storage medium may be a read-only memory, a magnetic disk, an optical disc, or the like.

The foregoing descriptions are merely optional embodiments of this disclosure, but are not intended to limit this disclosure. Any modification, equivalent replacement, improvement, and the like made without departing from the spirit and principle of this disclosure shall fall within the protection scope of this disclosure.

What is claimed is:

1. A method, applied to a photovoltaic power generation system, wherein the photovoltaic power generation system comprises a master node and a plurality of photovoltaic strings; an output end of each photovoltaic string is connected to an input end of the master node; each photovoltaic string comprises at least one photovoltaic power generation group; each photovoltaic power generation group comprises one photovoltaic module and one slave node; when any photovoltaic string comprises at least two photovoltaic power generation groups, the at least two photovoltaic power generation groups are connected in series; and the method comprising:
controlling at least two slave nodes in the photovoltaic power generation system to sequentially start up, and detecting a change status of an input voltage of the master node;
based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, wherein the superposition phenomenon comprises a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude;
when at least two slave node quantities in configuration data are equal, determining, from the plurality of photovoltaic strings obtained through grouping, a photovoltaic string whose slave node quantity is equal to the at least two slave node quantities, as a candidate photovoltaic string, wherein the configuration data comprises a slave node quantity of each photovoltaic string and a physical address of each photovoltaic string; and
for each determined candidate photovoltaic string, controlling any slave node located in the candidate photovoltaic string to start up and slave nodes other than the any slave node in the photovoltaic power generation system to shut down, determining a physical address of a photovoltaic string that has an input voltage or an input current, and using the physical address as a physical address of the candidate photovoltaic string.

2. The method of claim 1, wherein controlling at least two slave nodes in the photovoltaic power generation system to sequentially start up, and detecting a change status of an input voltage of the master node comprises:
controlling a first slave node in the photovoltaic power generation system to start up, detecting the input voltage, and using the input voltage as a first voltage;
when the first slave node has started up, controlling a second slave node in the photovoltaic power generation system to start up, detecting the input voltage, and using the input voltage as a second voltage; and
comparing the first voltage with the second voltage.

3. The method of claim 2, wherein grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings comprises:
when no superposition phenomenon occurs on the second voltage compared with the first voltage, grouping the first slave node and the second slave node into different photovoltaic strings; or when the superposition phenomenon occurs on the second voltage compared with the first voltage, grouping the first slave node and the second slave node into a same photovoltaic string.

4. The method of claim 1, wherein after grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, the method further comprises:
when a first slave node quantity is different from other slave node quantities in the configuration data, determining, from the plurality of photovoltaic strings obtained through grouping, a physical address of a photovoltaic string whose slave node quantity is equal to the first slave node quantity, as a physical address corresponding to the first slave node quantity.

5. The method of claim 1, wherein each slave node in the photovoltaic power generation system is corresponding to one voltage monitoring apparatus, the voltage monitoring apparatus is configured to monitor a relative voltage between an output end of a corresponding slave node and a voltage reference point, and the method further comprises:
for each photovoltaic string, when a slave node quantity of the photovoltaic string is greater than a preset quantity, dividing the photovoltaic string into a plurality of sub strings, wherein each substring comprises at least one photovoltaic power generation group, and a slave node quantity of each sub string is not greater than the preset quantity;
for each substring in the photovoltaic string, controlling each slave node in the substring to start up, and determining, based on a monitored relative voltage of each slave node in the sub string, an arrangement order of slave nodes located in the sub string;

for any two substrings in the photovoltaic string, controlling any slave node in one substring and slave nodes in the other substring to start up, and determining an ordinal position of the any slave node in the other substring based on monitored relative voltages of the slave nodes that have started up, to determine an arrangement order of slave nodes in the any two sub strings and determine an arrangement order of slave nodes in the photovoltaic string; and determining a physical address of each slave node in the photovoltaic string based on the arrangement order of the slave nodes in the photovoltaic string.

6. The method of claim 1, wherein before controlling at least two slave nodes in the photovoltaic power generation system to sequentially start up, and detecting a change status of an input voltage of the master node, the method further comprises:

for each connected slave node, controlling the slave node to start up and other slave nodes to shut down, and when determining that the input voltage of the master node is not detected, disconnecting from the slave node that has started up.

7. An apparatus, applied to a photovoltaic power generation system, wherein the photovoltaic power generation system comprises a master node and a plurality of photovoltaic strings; an output end of each photovoltaic string is connected to an input end of the master node; each photovoltaic string comprises at least one photovoltaic power generation group; each photovoltaic power generation group comprises one photovoltaic module and one slave node; when any photovoltaic string comprises at least two photovoltaic power generation groups, the at least two photovoltaic power generation groups are connected in series, the apparatus comprising:

a non-transitory computer readable storage medium having instructions stored therein, which when executed by a processor, cause the apparatus to:

control at least two slave nodes in the photovoltaic power generation system to sequentially start up;

detect a change status of an input voltage of the master node when the at least two slave nodes are controlled to sequentially start up;

based on the detected change status, group any two slave nodes for which a superposition phenomenon occurs on the input voltage during sequential startup and corresponding photovoltaic modules into a same photovoltaic string, and group any two slave nodes for which no superposition phenomenon occurs on the input voltage during sequential startup and corresponding photovoltaic modules into different photovoltaic strings, to obtain a plurality of photovoltaic strings, wherein the superposition phenomenon is a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude; and when at least two slave node quantities in configuration data are equal, determine, from the plurality of photovoltaic strings obtained through grouping, a photovoltaic string whose slave node quantity is equal to the at least two slave node quantities, as a candidate photovoltaic string, wherein the configuration data comprises a slave node quantity of each photovoltaic string and a physical address of each photovoltaic string; and for each determined candidate photovoltaic string, control any slave node located in the candidate photovoltaic string to start up and slave nodes other than the any slave node in the photovoltaic power generation system to shut down, determine a physical address of a photovoltaic string that has an input voltage or an input current, and use the physical address as a physical address of the candidate photovoltaic string.

8. The apparatus of claim 7, wherein the instructions, which when executed by the processor, further cause the apparatus to:

control a first slave node in the photovoltaic power generation system to start up;

when the first slave node is controlled to start up, detect the input voltage, and use the input voltage as a first voltage;

when the first slave node has started up, control a second slave node in the photovoltaic power generation system to start up; and detect the input voltage, use the input voltage as a second voltage, and compare the first voltage with the second voltage.

9. The apparatus of claim 8, wherein the instructions, which when executed by the processor, further cause the apparatus to: when no superposition phenomenon occurs on the second voltage compared with the first voltage, group the first slave node and the second slave node into different photovoltaic strings; or when the superposition phenomenon occurs on the second voltage compared with the first voltage, group the first slave node and the second slave node into a same photovoltaic string.

10. The apparatus of claim 7, wherein the instructions, which when executed by the processor, further cause the apparatus to: when a first slave node quantity is different from other slave node quantities in the configuration data, determine, from the plurality of photovoltaic strings obtained through grouping, a physical address of a photovoltaic string whose slave node quantity is equal to the first slave node quantity, as a physical address corresponding to the first slave node quantity.

11. The apparatus of claim 7, wherein each slave node in the photovoltaic power generation system is corresponding to one voltage monitoring apparatus, the voltage monitoring apparatus is configured to monitor a relative voltage between an output end of a corresponding slave node and a voltage reference point, and the instructions, which when executed by the processor, further cause the apparatus to:

for each photovoltaic string, when a slave node quantity of the photovoltaic string is greater than a preset quantity, divide the photovoltaic string into a plurality of sub strings, wherein each sub string comprises at least one photovoltaic power generation group, and a slave node quantity of each sub string is not greater than the preset quantity;

for each substring in the photovoltaic string, determine, based on a monitored relative voltage of each slave node in the sub string, an arrangement order of slave nodes located in the substring;

for any two substrings in the photovoltaic string, control any slave node in one substring and slave nodes in the other substring to start up, and determine an ordinal position of the any slave node in the other substring based on monitored relative voltages of the slave nodes that have started up, to determine an arrangement order of slave nodes in the any two sub strings and determine an arrangement order of slave nodes in the photovoltaic string; and determine a physical address of each slave node in the photovoltaic string based on the arrangement order of the slave nodes in the photovoltaic string.

12. The apparatus of claim 7, wherein the instructions, which when executed by the processor, further cause the apparatus to: for each connected slave node, control the slave node to start up and other slave nodes to shut down; and when determining that the input voltage of the master node is not detected, disconnect from the slave node that has started up.

13. A physical address determining device, coupled to a photovoltaic power generation system, wherein the photovoltaic power generation system comprises a master node and a plurality of photovoltaic strings, an output end of each photovoltaic string is connected to an input end of the master node, each photovoltaic string comprises at least one photovoltaic power generation group, each photovoltaic power generation group comprises one photovoltaic module and one slave node, when any photovoltaic string comprises at least two photovoltaic power generation groups, the at least two photovoltaic power generation groups are connected in series, and wherein the device comprises a processor and a memory, the memory stores at least one instruction, and the instruction is loaded and executed by the processor to perform operations comprising:

controlling at least two slave nodes in the photovoltaic power generation system to sequentially start up, and detecting a change status of an input voltage of the master node;

based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, wherein the superposition phenomenon comprises a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude;

when at least two slave node quantities in configuration data are equal, determining, from the plurality of photovoltaic strings obtained through grouping, a photovoltaic string whose slave node quantity is equal to the at least two slave node quantities, as a candidate photovoltaic string, wherein the configuration data comprises a slave node quantity of each photovoltaic string and a physical address of each photovoltaic string; and for each determined candidate photovoltaic string, controlling any slave node located in the candidate photovoltaic string to start up and slave nodes other than the any slave node in the photovoltaic power generation system to shut down, determining a physical address of a photovoltaic string that has an input voltage or an input current, and using the physical address as a physical address of the candidate photovoltaic string.

14. A non-transitory computer readable storage medium, wherein the non-transitory computer readable storage medium stores at least one instruction, and the at least one instruction is loaded and executed by a processor to perform operations comprising:

controlling at least two slave nodes in a photovoltaic power generation system to sequentially start up, and detecting a change status of an input voltage of a master node of the photovoltaic power generation system, wherein the photovoltaic power generation system comprises a plurality of photovoltaic strings, an output end of each photovoltaic string is connected to an input end of the master node, each photovoltaic string comprises at least one photovoltaic power generation group, each photovoltaic power generation group comprises one photovoltaic module and one slave node, when any photovoltaic string comprises at least two photovoltaic power generation groups, the at least two photovoltaic power generation groups are connected in series;

based on the detected change status, grouping any two slave nodes for which a superposition phenomenon occurs on the input voltage during sequential startup and corresponding photovoltaic modules into a same photovoltaic string, and grouping any two slave nodes for which no superposition phenomenon occurs on the input voltage during sequential startup and corresponding photovoltaic modules into different photovoltaic strings, to obtain a plurality of photovoltaic strings, wherein the superposition phenomenon comprises a phenomenon that an amplitude increment in the input voltage is within a preset neighborhood range of unit amplitude, the unit amplitude is amplitude of the input voltage of the master node when only one slave node starts up, and the preset neighborhood range is a numerical range centered on the unit amplitude;

when at least two slave node quantities in configuration data are equal, determining, from the plurality of photovoltaic strings obtained through grouping, a photovoltaic string whose slave node quantity is equal to the at least two slave node quantities, as a candidate photovoltaic string, wherein the configuration data comprises a slave node quantity of each photovoltaic string and a physical address of each photovoltaic string; and for each determined candidate photovoltaic string, controlling any slave node located in the candidate photovoltaic string to start up and slave nodes other than the any slave node in the photovoltaic power generation system to shut down, determining a physical address of a photovoltaic string that has an input voltage or an input current, and using the physical address as a physical address of the candidate photovoltaic string.

\* \* \* \* \*